United States Patent [19]

Gitman

[11] Patent Number: 4,473,350
[45] Date of Patent: Sep. 25, 1984

[54] OXY-FUEL BURNER

[75] Inventor: Grigory M. Gitman, Atlanta, Ga.

[73] Assignee: The Cadre Corporation, Atlanta, Ga.

[21] Appl. No.: 391,601

[22] Filed: Jun. 24, 1982

[51] Int. Cl.³ .............................................. F23D 11/36
[52] U.S. Cl. ................................... 431/160; 431/187; 239/132.3; 239/424.5
[58] Field of Search ....................... 431/160, 353, 187; 239/132.3, 132, 433, 424.5

[56] References Cited

U.S. PATENT DOCUMENTS

| | | | |
|---|---|---|---|
| 1,979,757 | 11/1934 | Melot | 431/353 |
| 2,368,370 | 1/1945 | Maxon | 431/187 |
| 3,545,903 | 12/1970 | McCullough | 431/160 |
| 3,856,457 | 12/1974 | Miller | 431/353 |

*Primary Examiner*—Carroll B. Dority, Jr.
*Attorney, Agent, or Firm*—George M. Thomas

[57] ABSTRACT

An oxygen-fuel burner of the rocket burner type includes a graphite burner block for direct exposure to the interior of a furnace, and a cylindrical combustion chamber formed through the hot face of the burner block and extending into the burner block. An oxygen supply conduit delivers oxygen to the combustion chamber along the center line of the combustion chamber and fuel supply ducts deliver fuel to the combustion chamber at the concave surface of the combustion chamber. A plurality of rectilinear cooling bores extend into the burner block and are arranged in a parallel array about the combustion chamber. A liquid coolant header moves cooling liquid through a plurality of parallel supply tubes which are telescopically received within the cooling bores, thereby maintaining the burner block at a reduced temperature. The nozzle that supplies the oxygen to the combustion chamber is movable along the length of the combustion chamber so as to change the shape of the flame emitted from the burner.

18 Claims, 5 Drawing Figures

OXY-FUEL BURNER

BACKGROUND OF THE INVENTION

This invention relates to burners for electric arc furnaces, ladles and other type metal and other product melting furnaces for high temperature heating work products, and the like, wherein fuel and oxygen are mixed to form a high-velocity flame. More particularly, the invention relates to an oxy-fuel burner of the rocker burner type which includes a combustion chamber recessed into a graphite burner block, where the fuel is supplied to the walls of the combustion chamber for film cooling, and wherein the burner block includes a plurality of parallel cooling bores arranged in an array about the combustion chamber so as to reduce the temperature of the burner block and the combustion chamber.

High-velocity or "rocket" burners are utilized in high temperature conditions and in conditions where it is desirable to direct a flame toward a given area. The high velocity of the flamegenerates a loud noise, and the high temperature of the flame raises the temperature of the burner to a level that tends to rapidly deteriorate the burner. In some applications, it is desirable to cut off the supply of oxygen and fuel to the burner while the work product in the burner is still hot or is still continuing to be heated by other heat sources. Under these circumstances, the burner is subjected to heat emitted from the work product and from the other heat sources and the burner continues to deteriorate.

In the past, various steps have been utilized to avoid the deterioration of high-temperature burners in furnace atmospheres. For example, some burner designs include water cooling features, whereby water is rapidly circulated at high volumes so as to extract heat from the burner. This tends to avoid rapid oxidation and other deterioration of the burner. During the operation of some furnaces the burners are physically withdrawn from the furnace chamber when the burner is not fired so as to avoid prolonged exposure of the burner to the heat emitted within the furnace. In other furnaces the idle burners are not physically withdrawn from the furnace chamber but a supply of air is moved through the idle burner and into the furnace so that the air cools some of the exposed surfaces of the burner.

While some of the foregoing features have been successful in prolonging the lives of high-temperature, high-velocity burners for furnaces, certain problems have not been overcome. For example, when an idle burner is withdrawn from the furnace, a certain amount of heat and noise is emitted from the furnace, and the burner must be designed so that it can be withdrawn. Also, when air is supplied through an idle burner to cool and protect the burner, the added air in the furnace tends to change the chemistry of processing. Also, the use of water to cool a high-temperature burner is somewhat hazardous in that if a crack should occur in the burner or if water flow is interrupted or if some other condition in the burner should occur that causes water to leak into the confines of the burner or into the furnace, an explosion will occur.

SUMMARY OF THE INVENTION

Briefly described, the present invention comprises a high-temperature, high-velocity oxygen-fuel burner for use with furnaces and the like which includes a high temperature-resistant burner block for direct exposure to the interior of a furnace or the like, with the burner block including a combustion chamber formed through the hot face of the burner block and extending into the burner block. In the disclosed embodiment oxygen supply conduit means extends through the rear of the burner block and directs oxygen into the central portion of the combustion chamber, while fuel supply conduit means extends through the burner block and directs a major portion of the fuel into the base of the combustion chamber and about the oxygen and directs additional fuel about the concave surface of the combustion chamber, so that the fuel supplied to the concave surface causes film cooling to take place within the combustion chamber and so the oxygen is generally present at the center of the flame and the fuel generally surrounds the oxygen in the flame. The introduction of oxygen and fuel in this manner provides initial mixing in the combustion chamber. A plurality of cooling bores are formed from the rear surface inwardly of the burner block and are arranged parallel to one another in a circular array about the combustion chamber. Coolant supply conduits are telescopically received within the cooling bores and the supply conduits deliver liquid coolant to the ends of the cooling bores adjacent the hot face of the burner block. The oxygen supply conduit is movable along the length of the burner block so that the supply of oxygen can be delivered at various positions along the length of the combustion chamber and so that the shape and velocity of the flame developed within and emitted from the combustion chamber can be controlled.

Thus, it is an object of this invention to provide a burner for the development of a high-temperature, high-velocity flame from a mixture of oxygen and fuel into a furnace or other space, wherein the burner includes a burner block that is directly exposed to the interior of the furnace, and wherein the burner block and surfaces of the combustion chamber are continuously cooled by liquid, and wherein the surfaces of the combustion chamber of the burner block are protected by film cooling.

Another object of this inventio. is to provide an oxygen-fuel burner that includes a graphite burner block that can be directly exposed to the interior of a hot furnace and wherein the burner block is internally cooled so as to prolong its life of operation.

Another object of this invention is to provide an oxygen-fuel burner of the rocket burner type which includes means for adjusting the shape of the flame emitted within and beyond the combustion chamber, and which includes a burner block that is continuously exposed to the interior of a furnace and which includes means for cooling the burner block and for protecting the combustion chamber.

Another object of this invention is to provide an oxygen-fuel burner which emits a high-velocity flame and which is durable in operation and inexpensive to construct and to maintain.

Other objects, features and advantages of the present invention will become apparent upon reading the following specification, when taken in conjunction with the accompanying drawings.

DETAILED DESCRIPTION

Figure 1:
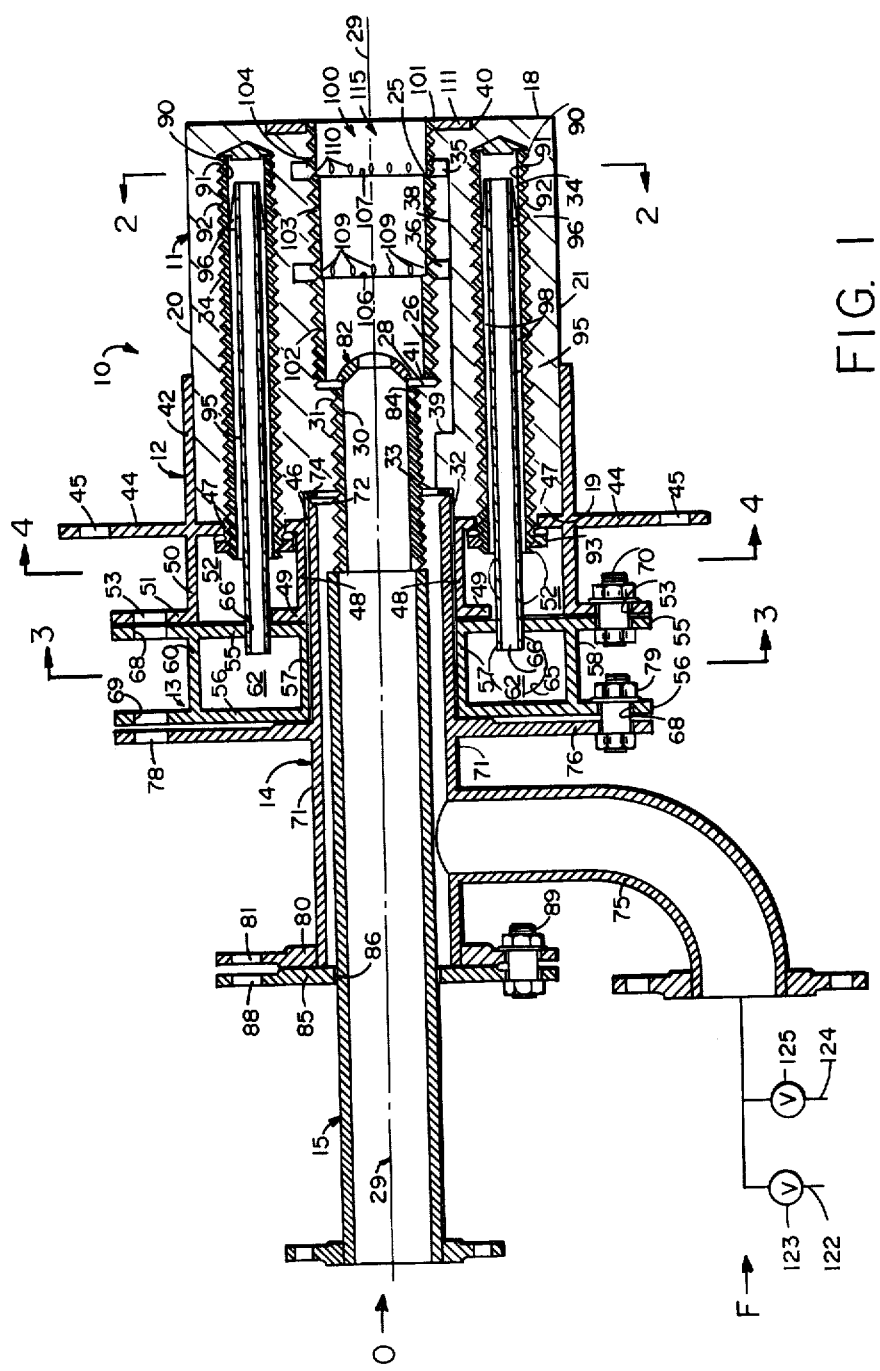
FIG. 1 is a side cross-sectional view of the burner assembly.

Referring now in more detail to the drawing, in which like numerals indicate like parts throughout the several views, FIG. 1 illustrates the oxygen-fuel burner 10 which includes a burner block 11, burner block support collar 12, cooling water header 13, fuel supply conduit 14 and oxygen supply conduit 15.

Figure 2:
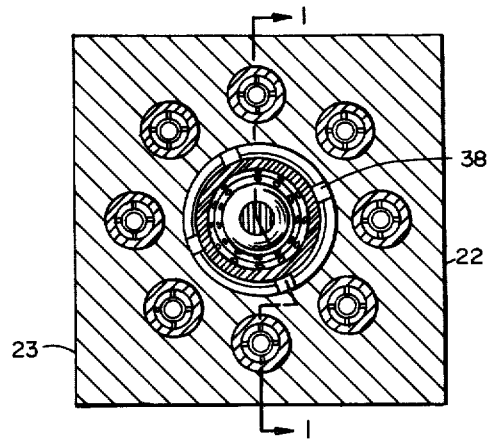
FIG. 2 is an end cross-sectional view of the burner assembly, taken along 2—2 of FIG. 1.

In the embodiment illustrated, burner block 11 is fabricated of graphite and is substantially rectangular in shape, including a "hot" face 18, a rear face 19, upper surface 20, lower surface 21, and side surfaces 22 and 23 (FIG. 2). A cylindrical bore 25 is formed through the central portion of hot face 18 and extends interiorally of burner block 11. Cylindrical bore 25 is threaded with helical threads 26 and includes a flat inner wall 28. The longitudinal center axis 29 of the cylindrical bore 25 is oriented at a right angle with respect to the plane of hot face 18.

Burner block 11 also includes conduit bore 30 which extends through the rear portion of the burner block and which is of a smaller diameter than cylindrical bore 25, and which is also coaxial with center axis 29. Conduit bore 30 is also internally threaded with helical threads 31. Counter bore 32 is formed through rear face 19 concentrically about conduit bore 30.

A plurality of rectilinear, cylindrical cooling bores 34 are formed in burner block 11. Cooling bores 34 are arranged parallel to one another and parallel to center axis 29 of burner block 11 and are arranged in a circular array (FIG. 2) about cylindrical bore 25. Each cooling bore 34 is internally threaded with helical threads and each bore extends from adjacent hot face 18 rearwardly through burner block 11 and opens through the rear surface 19 of the burner block.

A pair of annular fuel supply grooves 35 and 36 are formed in burner block 11, and extend radially outwardly from cylindrical bore 25, with annular groove 35 located adjacent hot face 18 of the burner block and with annular groove 36 located approximately halfway between annular groove 35 and flat inner wall 28 of cylindrical bore 25. Rectilinear grooves 38 (FIG. 2) are formed in burner block 11 and extend longitudinally with respect to the burner block, parallel to center axis 29. The rectilinear grooves 38 are formed at 90° intervals about cylindical bore 25 and extend radially outwardly from the cylindrical bore 25 and extend longitudinally from annular fuel supply groove 35 toward counterbore 32 (FIG. 1), intersecting annular fuel supply groove 36. The rectilinear grooves 38 are undercut at 39 where they intersect counterbore and its face 33. Annular recess 40 is formed in the hot face 18 of burner block 11 and extends concentrically about cylindrical bore 25.

As illustrated in FIG. 1, burner block support collar 12 includes a rectangular frame 42 that is supported at one edge by support plate 44. Frame 42 is sized and shaped so as to fit snugly about the exterior of burner block 11, in sliding relationship therewith, so that burner block 11 abuts support plate 44. Frame 42 extends approximately one-third the distance from rear face 19 of burner block 11 toward hot face 18. The support plate 44 extends outwardly of frame 42 and includes mounting holes 45 through which screws, bolts, or other features can be inserted for mounting theburner assembly 10 to a furnace, etc. A central opening 46 is formed in support plate 44, with the internal diameter of opening 46 corresponding to the diameter of counterbore 32 of burner block 11. Inner sleeve 48 extends from support plate 44 about central opening 46, and circular flange 49 extends radially outwardly from sleeve 48. Sleeve 48 is concentric with respect to the center axis 29 of the burner assembly. Outer housing sidewalls 50 are also mounted to support plate 44, and outer flange 51 extends radially outwardly from sidewalls 50. Outer rectangular flange 51 is located in a common plane with respect to inner flange 49, and outer housing sidewalls 50 extend about inner collar 48, so that header chamber 52 is formed behind support plate 44 and between inner sleeve 48 and housing sidewalls 50. Connector openings 53 are formed through outer flange 51. In the embodiment illustrated, inner sleeve 48 is circular and outer housing sidewalls 50 are formed in a rectangular arrangement and form a support frame about the header chamber 52.

Figure 3:
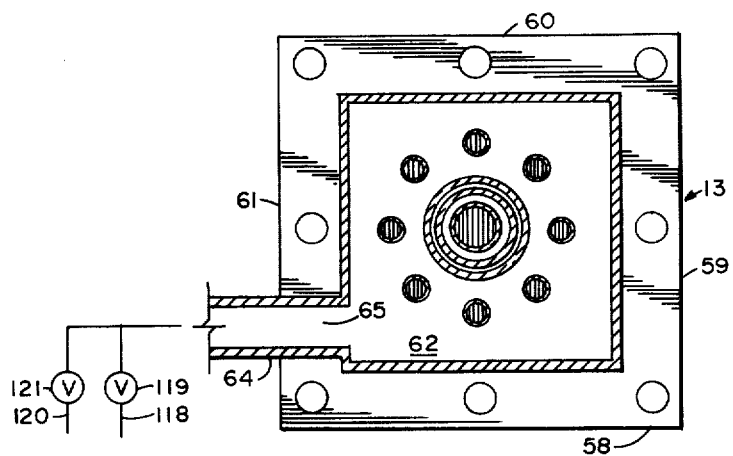
FIG. 3 is an end cross-sectional view of the burner assembly, taken along lines 3—3 of FIG. 1.

As illustrated in FIGS. 1 and 3, cooling water supply header 13 comprises a pair of spaced, parallel support plates 55 and 56, inner spacer sleeve 57 connected at its ends to support plates 55 and 56, and outer wall segments 58, 59, 60 and 61. The outer walls 58-61 are connected to one another in a rectangular arrangement and are each connected to support plates 55 and 56 so as to form cooling water header chamber 62. A water supply conduit 64 communicates with header chamber 62 through opening 65 in outer wall 61.

A plurality of cooling liquid supply openings 66 are formed in support plate 55 and are in concentric alignment with respect to the cooling liquidsupply openings 47 of support plate 44 and in concentric alignment with the cooling bores 34 of burner block 11. Mounting holes 68 are formed in support plate 55, while mounting holes 69 are formed in support plate 56. Bolts or other connectors 70 connect cooling water header 13 to burner block support collar 12.

As illustrated in FIG. 1, fuel supply conduit 14 includes central conduit section 71 that extends coaxially with respect to the center axis 29 of burner block 11 and which extends through central sleeves 48 and 57 of burner block support collar 12 and cooling water header 13, with a delivery end 72 received in counterbore 32 of the burner block. A gasket 74 is positioned between the delivery end 72 and the flat face 33 of the counterbore 32. Branch supply conduit 75 intersects the central section 71 of fuel supply conduit 14. Mounting flange 76 extends radially outwardly from central section 71, and mounting holes 78 are formed in flange 76, and the holes 78 are in alignment with the mounting holes 69 of cooling water header 13. Bolts 79 or similar connectors extend through the aligned openings 69 and 78 to mount the gas supply conduit 14 to the cooling water header 13. A similar but smaller mounting flange 80 extends radially outwardly from the rear portion of central section 71, and mounting holes 81 are formed therein.

Oxygen supply conduit 15 comprises a recilinear conduit with a nozzle 82 mounted at its delivery end. The inner end portion adjacent nozzle 82 is externally threaded with helical threads 84 that engage the threads 31 of the conduit bore 30 of burner block 11. Mounting plate 85 includes a central opening 86 that is positioned in telescoped relationship about gas supply conduit 15, and includes mounting holes 88 which are alignable with mounting holes 81 of gas supply conduit 14. Bolts 89 or similar connectors connect the mounting plates 80 and 85 together. This holds oxygen supply conduit 15 in concentric relationship with respect to center axis 29 of burner block 11. The position of nozzle 82 of oxygen supply conduit 15 can be changed within the cylindrical bore 25 of burner block 11 by rotating the oxygen supply conduit 15. When the conduit 15 is rotated, the engaging threads 31 and 84 move the conduit 15 and its nozzle 82 along the center axis 29 of the burner block 11, causing the nozzle to be moved further into or withdrawn further from cylindrical bore 25.

Figure 4:
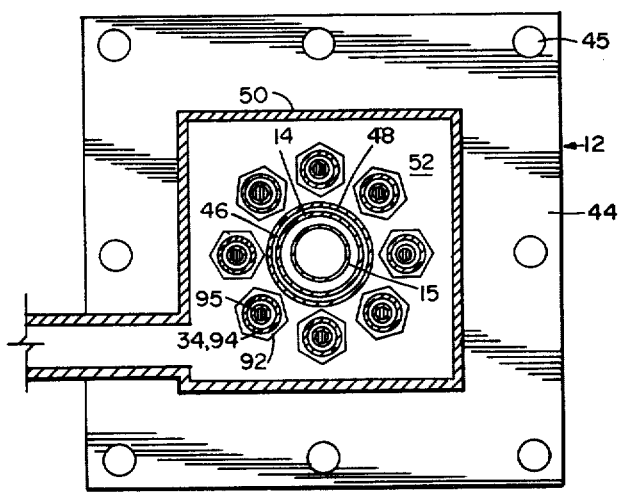
FIG. 4 is an end cross-sectional view of the burner assembly, taken along lines 4—4 of FIG. 1.

As illustrated in FIGS. 1, 2 and 4, the cooling bores 34 of burner block 11 are internally threaded with helical threads 90, and rectilinear water outlet tubes or sleeves 91 are positioned within the bores 34. Each sleeve 91 is externally threaded, and the external threads 92 of each sleeve engage the internal threads 90 of its bore 34. The sleeves 91 extend from adjacent the hot face 18 of burner block 11 rearwardly through the rear face 19 of the burner block, through the cooling liquid supply openings 47 of the support plate 44 and into the header chamber 52. Nuts 93 or other connectors are threaded about the protruding end portions 94 of the sleeves 91 to make sealing contact with support plate 44. Liquid supply conduits 95 are mounted in the cooling liquid supply openings 66 of cooling water header 13, and each supply conduit 95 is telescopically received within a sleeve 91 of the burner block 11. Positioning fins 96 protrude radially from the distal ends of the liquid supply conduits 95 so as to maintain the liquid supply conduits 95 in concentric, spaced relationship with respect to sleeves 91. This causes an annular space 98 to be formed between each liquid supply conduit 95 and its sleeve 91. Thus, the liquid supply conduits 95 function to move liquid from cooling water header chamber 62 telescopicaly through sleeves 91 to the inner end of cooling bores 34, whereupon the liquid begins to move in the opposite direction back through the annular space 98 about each liquid supply conduit 95, and the liquid then moves out of the protruding end portion 94 of sleeve 91 and into header chamber 52, where the liquid is drained from the burner assembly.

Combustor sleeve 100 is positioned within cylindrical bore 25 of burner block 11. The external surface of combustor sleeve 100 partitions the slots 38 so that the slots become elongated fuel passageways with each slot having fuel inlet 41 between the combustor sleeve and oxygen supply conduit 15. The external surface of combustor sleeve 100 is formed with helical threads 101, and the threads 101 of the combustor sleeve engage the threads 26 of the cylindrical bore 25. The combustor sleeve is formed in three integral cylindrical sections, inner section 102, intermediate section 103, and outer section 104. The wall thicknesses of cylindrical sections 102, 103 and 104 are progressively thinner from the inner section toward the outer section, so that the diameters of the cylindrical sections 102, 103 and 104 are progressively larger from the inner section toward the outer section. This forms an annular rim 106 between inner section 102 and intermediate section 103, and a second annular rim 107 between intermediate section 103 and outer section 104. A plurality of fuel inlet ports 109 are formed in intermediate section 103 immediately adjacent annular rim 106, and a second plurality of fuel inlet ports 110 are formed in outer cylindrical section 104 immediately adjacent annular rim 107. The fuel inlet ports 109 communicate with annular fuel supply groove 36 of burner block 11, while fuel inlet ports 110 communicate with annular fuel supply groove 35. A face plate 111 is connected to the outer end portion of combustor sleeve 100 and is received within the annular recess 40 in hot face 18 of burner block 11.

Figure 5:
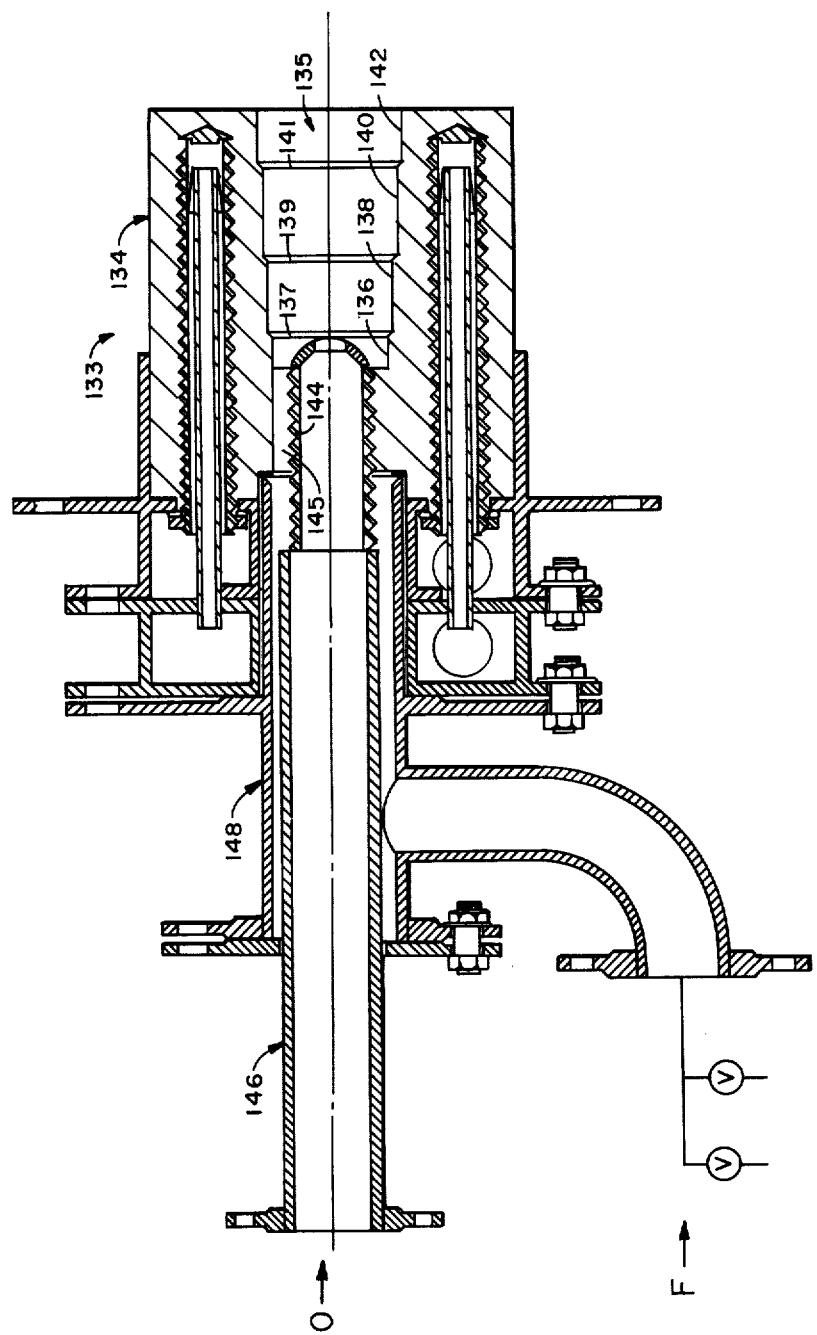
FIG. 5 is a partial side cross-sectional view, similar to FIG. 1, but illustrating a second embodiment of the invention.

As illustrated in FIG. 5, the second disclosed embodiment 133 of the invention does not include a combustor sleeve but the burner block 134 has its bore 135 formed with cylindrical sections 136, 138, 140, 142 which are progressively larger from the inner section 136 toward outer section 142 with annular shoulders 137, 139 and 141 between the cylindrical sections. The inner cylindrical section 141 merges with conduit bore 144 and four rectilinear channels 145 are formed at 90° intervals about conduit bore 144. Oxygen supply conduit 146 is threaded through bore 144 and closes the inner side of the channels to form the rectilinear channels 145 into fuel passageways which direct fuel from fuel supply conduit about oxygen supply conduit 146 into the cylindrical sections 136, 138, 140, 142 of bore 135.

Operation

When the oxygen-fuel burner 10 is in operation, a supply of cooling liquid, such as water, is provided under pressure to cooling water header 13, and the water moves from header chamber 62 through the array of liquid supply conduits 95 and into the burner block 11. When the liquid moves through the open ends of the liquid supply conduits 95 adjacent the hot face 18 of the burner block, the liquid then begins its movement in the opposite direction back through the annular spaces 98 between the liquid supply conduits 95 and sleeve 91. This delivers the cooling liquid in a circular array about the combustor sleeve 100, and the movement of the cooling liquid along the sleeves 91 of the cooling bores 34 tends to extract the heat from the sleeves. The positive contact made between the threads 90 of the cooling bores 34 assures that maximum heat transfer will occur between the burner block 11 and the sleeves 91, so as to maximize the heat transfer away from the burner block. The water moving out of the sleeves 91 empties into the header chamber 52 and is drained away from the burner assembly.

In the meantime, fuel and oxygen are delivered to the burner block 11. Oxygen is delivered through oxygen supply conduit 15, through nozzle 82 into the combustor sleeve 100. Fuel is delivered through gas supply conduit 14 about oxygen conduit 15, with the fuel entering the burner block through the plurality of rectilinear grooves 38. Most of the fuel moves through the ports 41 formed through the flat inner wall 28 of cylindrical bore 25 into the combustor sleeve 100, and the rest of the fuel moves to the annular fuel supply grooves 35 and 36 where the fuel circulates around the combustor sleeve 100 and enters the combustor sleeve through the fuel inlet ports 109 and 110. With this arrangement, the oxygen is supplied centrally to the combustor sleeve 100 while the fuel is supplied peripherally about the oxygen to the combustorsleeve. Therefore, the cylindrical bore 25 of the burner block 11 and its combustor sleeve 100 form a combustion chamber 115 that opens through the hot face 18 of the burner block 11 and a flame is generated within the combustion chamber 115 and is directed outwardly of the combustion chamber, away from the burner block 11. Since the fuel is supplied about the oxygen, the flame formed from the burner tends to locate the oxygen in the center of the flame and with a portion of the fuel located primarily at the perimeter of the flame. This tends to form a non-oxidizing flame.

The movement of the fuel in stages to the combustion chamber 115, first through the ports 41 at the inner end of the combustion chamber, through the fuel inlet ports 109, and through the fuel inlet ports 110 causes the flame to be developed within the combustion chamber 115. The fuel also tends to form a film on the interior surface of the combustor sleeve 100, thereby insulating the sleeve from heat of the flame. The progressive increase in diameter of the combustor sleeve 100 tends to enhance the forming of a film of fuel in the second and third cylindrical sections of the combustor sleeve 100, where the flame emitted from the burner is more intense.

The shape of the flame developed within the combustion chamber 115 can be controlled to some extent by repositioning the nozzle 82 of oxygen supply conduit 15. The nozzle 82 can be moved further into the combustion chamber 115 by rotating the oxygen supply conduit 15, so that the inner engaging threads 31 and 84 relocate the nozzle 82.

As schematically indicated in FIG. 3, the supply of fluid to cooling water header chamber 52 can be controlled by valves located in the water supply conduit 64. For example, a water conduit 118 can be connected by valve 119 to water supply conduit 64, and an air conduit 120 can be connected by valve 121 to water supply conduit 64. With this arrangement the water within the system can be purged from the system by closing the water valve 119 and opening the air valve 121. This permits the rapid removal of water from the burner in a situation where the operator detects a leak or other malfunction of the burner. Additionally, the air can be used to continue the cooling of the burner.

As schematically indicated in FIG. 1, fuel supply conduit 14 is connected to fuel line 122 through valve 123, and is also connected to inert gas supply line 124 through valve 125. With this arrangement, a supply of gas or other fuel can be provided when valve 123 is open, or in the alternative, a supply of inert gas can be provided from supply line 124 through valve 125. This is desirable in a situation where the burner is not fired but is idle, and is still installed within the furnace and is exposed to the heat emitted from the work product of the furnace and to the flames emitted from other burners. The inert gas tends to form a cloud within the combustion chamber 115 so as to protect the combustion chamber from oxidation. Moreover, the supply of inert gas as opposed to oxygen through the burner in these idle conditions does not add oxygen to the furnace during the operation of other burners in the furnace. In the meantime, the coolant water can continue to circulate throughout the burner so as to continuously cool the burner and protect the burner from deterioration. In addition, the burner 10 can be operated in a low fire condition and maintained hot so as to avoid closing of the burner combustor sleeve 100 by molten metal splash from within the furnace.

The operation of the oxygen-fuel burner 133 of FIG. 5 is similar to the operation of burner 10, but all of the fuel enters the bore 135 through fuel passageways 145. The fuel surrounds the oxygen emitted from oxygen supply conduit 146 and tends to flow adjacent the surfaces of the cylindrical sections 136, 138, 140 and 142, thereby functioning to form a barrier of fuel adjacent the surfaces of bore 135, resulting in film cooling of the bore.

While the invention has been disclosed with oxygen being supplied through oxygen supply conduit 15 and fuel suppied through fuel supply conduit 14, it should be understood that the oxygen and fuel supplies can be interchanged with the oxygen supplied through the fuel supply conduit and fuel supplied through the oxygen supply conduit and the burner will still function.

While this invention has been described in detail with particular reference to a preferred embodiment thereof, it will be understood that variations and modifications can be effected within the spirit and scope of the invention as described hereinbefore and as defined in the appended claims.

I claim:

1. An oxygen-fuel burner comprising a burner block for extending into a high temperature product melting furnace or the like with a hot face of the block extending toward the interior of the furnace, a combustion chamber formed through the hot face of and extending into said burner block, a source of fuel, fuel supply means in communication with said source of fuel for supplying fluid fuel through the surface of said combustion chamber and forming a film of fuel extending peripherally about the surface of said combustion chamber, a source of oxygen, oxygen supply means in communication with said source of oxygen for supplying oxygen longitudinally of said combustion chamber, and cooling conduit means in heat exchange relationship with said block and arranged about the combustion chamber, and liquid supply means for moving liquid through said cooling conduit means.

2. The oxygen-fuel burner of claim 1 and wherein said combustion chamber is approximately cylindrical with its center axis extending through the hot face of said block, and wherein said cooling conduit means comprises a plurality of cooling conduits arranged in an array about said combustion chamber with each conduit extending parallel to the center axis of said combustion chamber and are uniformly positioned about said combustion chamber.

3. The oxygen-fuel burner of claim 1 and wherein said combustion chamber is approximately cylindrical with its center axis extending through the hot face of said block, and wherein said oxygen supply means comprises a nozzle positioned at the axis of said combustion chamber and movable along the center axis within said combustion chamber, and wherein said fuel supply means comprises a plurality of conduits in communication with said combustion chamber at uniform positions about said combustion chamber.

4. The oxygen-fuel burner of claim 1 and wherein said combustion chamber is approximately cylindrical with its center axis extending through the hot face of said block, said combustion chamber being formed with at least two cylindrical sections of different diameters, with the cylindrical section of larger diameter located at the hot face of said block.

5. The oxygen-fuel burner of claim 4 and wherein said fuel supply means comprises a plurality of fuel passages extending through said burner block in communication with said combustion chamber at the larger diameter section of said combustion chamber at uniform positions adjacent said smaller diameter section of said combustion chamber.

6. The oxygen-fuel burner of claim 1 and wherein said combustion chamber is approximately cylindrical with its center axis extending through the hot face of said block, and wherein said cooling conduit means comprise a plurality of rectilinear cooling bores extending through said block parallel to the center axis of said combustion chamber and terminating adjacent said hot face and arranged in a circular array about said combustion chamber, and a cooling liquid supply conduit extending into and through a portion of each said cooling bore with an open delivery end positioned adjacent said hot face.

7. The oxygen-fuel burner of claim 6 and further including metal liners positioned within said cooling bores, and said bores and said liners having mating helical threads for making positive contact between the bores and liners to enhance heat transfer between said block and said liners and the cooling liquid moved through the metal liners.

8. The oxygen-fuel burner of claim 6 and wherein said cooling bores are positioned equidistant from the center axis of said combustion chamber and are each equally spaced from the others about said combustion chamber.

9. The oxygen-fuel burner of claim 1 and wherein said burner block is fabricated of graphite.

10. An oxygen-fuel burner comprising a burner block including a hot face for direct exposure to the interior of a furnace or the like, a combustion chamber formed in said burner block and opening through the hot face of said burner block, a source of oxygen, an oxygen supply passage in communication with said source of oxygen and extending through said burner block and intersecting said combustion chamber, a source of fuel, means forming a plurality of fuel supply passages in communication with said source of fuel and extending through said burner block and intersecting said combustion chamber uniformly about said combustion chamber for forming film of fuel extending peripherally about the surface of said combustion chamber, and fluid cooling meas in heat exchange relationship with said burner block for cooling said burner block.

11. The oxygen-fuel burner of claim 10 and wherein the combustion chamber of said burner block is approximately cylindrical and includes a metal liner, said liner and said burner block including engaged helical threads.

12. The oxygen-fuel burner of claim 11 and wherein said liner comprises at least two cylindrical sections of different internal diameters, with a larger diameter section positioned adjacent the hot face of said burner block, said larger diameter cylindrical section including fuel supply openings positioned adjacent said smaller diameter opening and in communication with said fuel supply passages.

13. An oxygen-fuel burner comprising a burner block including a hot surface for direct exposure to the interior of a furnace or the like, an approximately cylindrical combustion chamber including a concave inner surface formed in said burner block and opening through the hot face of said burner block, oxygen supply means for delivering oxygen to said combustion chamber, means forming a plurality of fuel supply passages through said burner block and intersecting the concave inner surface of the combustion chamber and constructed and arranged to deliver liquid fuel circumferentially about the concave inner surface of said combustion chamber for forming a film of fuel circumferentially about the concave surface of the combustion chamber, cooling conduit means in said burner block and arranged about said combustion chamber and means for moving cooling fluid through said cooling conduit means for cooling said burner block.

14. The oxygen-fuel burner of claim 13 and wherein said cooling conduit means comprises a plurality of rectilinear cooling bores formed in said burner block, and wherein said means for moving cooling fluid through said cooling conduit means comprises a coolant inlet header assembly, a plurality of rectilinear parallel coolant supply tubes each in communication at one of its ends with said header assembly and each spaced from the others in a pattern which corresponds to the placement of said cooling bores so that the coolant supply tubes are telescopically received in the cooling bores.

15. An oxygen-fuel burner comprising a burner block for extending into a high temperature product melting furnace or the like with one face of the block facing the interior of the furnace, a combustion chamber formed through the face of said block and extending into said block, a source of fluid fuel, a fuel supply passage, communicating with said source of fluid fuel and with said combustion chamber, said fuel supply passage including passage means extending into and positioned about said combustion chamber and arranged to form a film of fuel about the surfaces of said combustion chamber, an oxygen supply passage communicating with the central portion of said combustion chamber and arranged to supply oxygen longitudinally of said combustion chamber, each of said fuel supply passage, and said oxygen supply passage being in direct heat transfer contact with said block, and cooling passages in heat transfer relationship with said block, whereby cooling fluid passes through the cooling passages to cool the block, and the block cools the fuel supply passage and the oxygen supply passage.

16. The oxygen-fuel burner of claim 1 and further including a face plate positioned on the hot face of the burner block and extending about said combustion chamber.

17. The oxygen-fuel burner of claim 13 and further including a face plate positioned on the hot surface of said burner block and extending about said combustion chamber.

18. An oxygen-fuel burner comprising a burner block for extending into a high temperature product melting furnace or the like with a hot face of the block extending toward the interior of the furnace, a combustion chamber formed through the hot face of and extending into said burner block, said combustion chamber being approximately cylindrical with its center axis extending through the hot face of said block, said combustion chamber being formed with at least two cylindrical sections of different diameters, with the cylindrical section of larger diameter located adjacent the hot face of said block, fuel supply means for supplying fluid fuel to said combustion chamber, said fuel supply means comprising a plurality of conduits in communication with said combustion chamber through the larger diameter section of the combustion chamber at uniform positions adjacent said smaller diameter section of said combustion chamber for forming a film of fuel about the surfaces of the combustion chamber, oxygen supply means for supplying oxygen longitudinally along the center axis of said combustion chamber, and cooling conduit means in heat exchange relationship with said block and arranged about the combustion chamber, and liquid supply means for moving liquid through said cooling conduit means.

* * * * *